United States Patent
Mitsuhashi et al.

(10) Patent No.: US 9,975,993 B2
(45) Date of Patent: May 22, 2018

(54) SILANE COMPOUND CONTAINING PERFLUORO(POLY)ETHER GROUP

(71) Applicant: DAIKIN INDUSTRIES, LTD., Osaka-shi, Osaka (JP)

(72) Inventors: Hisashi Mitsuhashi, Settsu (JP); Takashi Nomura, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days. days.

(21) Appl. No.: 15/307,079

(22) PCT Filed: Mar. 31, 2015

(86) PCT No.: PCT/JP2015/060253
§ 371 (c)(1),
(2) Date: Oct. 27, 2016

(87) PCT Pub. No.: WO2015/166760
PCT Pub. Date: Nov. 5, 2015

(65) Prior Publication Data
US 2017/0044315 A1 Feb. 16, 2017

(30) Foreign Application Priority Data
Apr. 30, 2014 (JP) ................................ 2014-093326

(51) Int. Cl.
| C10M 107/50 | (2006.01) |
| C08G 65/336 | (2006.01) |
| C08G 77/24 | (2006.01) |
| C09K 3/18 | (2006.01) |
| C09D 5/00 | (2006.01) |
| C08G 65/00 | (2006.01) |
| C09D 171/00 | (2006.01) |

(52) U.S. Cl.
CPC ......... *C08G 65/336* (2013.01); *C08G 65/007* (2013.01); *C08G 77/24* (2013.01); *C09D 5/00* (2013.01); *C09D 171/00* (2013.01); *C09K 3/18* (2013.01); *C10M 107/50* (2013.01); *C08G 2650/48* (2013.01); *C10M 2229/0515* (2013.01); *C10N 2230/26* (2013.01)

(58) Field of Classification Search
CPC .... C08G 65/007; C08G 65/336; C08G 77/24; C08G 2650/48; C10M 107/50; C10M 2229/0515; C10M 2230/26; C09D 5/00; C09D 171/00; C09K 3/18
See application file for complete search history.

(56) References Cited

U.S. PATENT DOCUMENTS

2007/0149746 A1* 6/2007 Yamane .................... C07F 7/21
528/42
2014/0309329 A1* 10/2014 Sawada ................ C09D 5/1675
523/122
2015/0118502 A1 4/2015 Mitsuhashi et al.

FOREIGN PATENT DOCUMENTS

| JP | 2007-197425 A | 8/2007 | |
| JP | 2007197425 A * | 8/2007 | ............... C07F 7/21 |
| JP | 2013-241569 A | 12/2013 | |
| JP | 2013-256643 A | 12/2013 | |
| JP | 2014-37548 A | 2/2014 | |

OTHER PUBLICATIONS

International Preliminary Report on Patentability with translation of Written Opinion dated Nov. 1, 2016, issued by the International Searching Authority in application No. PCT/JP2015/060253.
International Search Report for PCT/JP2015/060253 dated Jun. 23, 2015.

* cited by examiner

*Primary Examiner* — James Goloboy
(74) *Attorney, Agent, or Firm* — Sughrue Mion, PLLC

(57) ABSTRACT

A perfluoro(poly)ether group containing silane compound of the formula (1):

$$(Rf\text{-}PFPE)_\alpha\text{-}X\text{-}(SiQ_kY_{3-k})_\beta \quad (1)$$

wherein Rf, PFPE, X, Y, Q, k, α and β are as defined herein, and which is able to from a layer having water-repellency, oil-repellency and antifouling property as well as high surface slip property and high friction durability.

36 Claims, No Drawings

SILANE COMPOUND CONTAINING PERFLUORO(POLY)ETHER GROUP

CROSS REFERENCE TO RELATED APPLICATIONS

This application is a National Stage of International Application No. PCT/JP2015/060253 filed Mar. 31, 2015, claiming priority based on Japanese Patent Application No. 2014-093326 filed Apr. 30, 2014, the contents of all of which are incorporated herein by reference in their entirety.

TECHNICAL FIELD

The present invention relates to a perfluoro(poly)ether group containing silane compound. The present invention also relates to a method of producing the perfluoro(poly)ether group containing silane compound and a surface-treating agent comprising it.

BACKGROUND ART

A certain fluorine-containing silane compound is known to be able to provide excellent water-repellency, oil-repellency, antifouling property, or the like when it is used in a surface treatment of a base material. A layer (hereinafter, referred to as a "surface-treating layer") formed from the surface-treating agent comprising a fluorine-containing silane compound is applied to various base materials such as a glass, a plastic, a fiber and a building material as a so-called functional thin film.

As such fluorine-containing silane compound, a perfluoropolyether group containing silane compound which has a perfluoropolyether group in its molecular main chain and a hydrolyzable group bonding to a Si atom in its molecular terminal or terminal portion is known. For example, Patent Literature 1 describes a fluoro-containing silane compound wherein a perfluoropolyether group is bonded to a plurality of Si atom having a hydrolyzable group via a linker moiety.

PRIOR ART LITERATURE

Patent Literature

Patent Literature 1: JP 2007-197425 A

SUMMARY OF THE INVENTION

Problem to be Solved by the Invention

Recently, a smartphone and a tablet terminal rapidly become popular, and in use of a touch panel, it is desired to provide excellent tactile feeling (use feeling) when a user operates by touching a display panel with his finger. Furthermore, high durability is requested in order to provide excellent tactile feeling (use feeling) for a long time.

However, a layer formed from a surface-treating agent containing the above-mentioned conventional perfluoropolyether group containing silane compound wherein a plurality of Si atom is bonded to the linker is no longer necessarily enough to meet the increasing demand to improve the surface slip property and the friction durability.

An object of the present invention is to provide a novel perfluoro(poly)ether group containing silane compound which is able to form a layer having water-repellency, oil-repellency and antifouling property as well as high surface slip property and high friction durability. In addition, an object of the present invention is to provide a surface-treating agent comprising the perfluoro(poly)ether group containing silane compound.

Means to Solve the Problem

As a result of intensively studying, the inventors of the present invention have found that a perfluoro(poly)ether group containing silane compound is able to form a surface-treating layer having excellent surface slip property and excellent friction durability in addition to water-repellency, oil-repellency and antifouling property, wherein at least one Si atom is bonded to a perfluoro(poly)ether group via a linker and a Si atom having a hydrolyzable group is bonded to the at least one Si atom via another linker.

Therefore, according to first aspect of the present invention, there is provided a perfluoro(poly)ether group containing silane compound of the formula (1):

$$(Rf\text{-}PFPE)_\alpha\text{-}X\text{---}(SiQ_kY_{3-k})_\beta \qquad (1)$$

wherein:

Rf represents, each independently at each occurrence, a $C_{1-16}$ alkyl which may be substituted by one or more fluorine atoms;

PFPE represents  $-(OC_4F_8)_a-(OC_3F_6)_b-(OC_2F_4)_c-(OCF_2)_d-$ wherein a, b, c and d are each independently an integer of 0 or more and 200 or less, the sum of a, b, c and d is 1 or more and the occurrence order of the respective repeating units in parentheses with the subscript a, b, c or d is not limited in the formula;

X represents, each independently at each occurrence, a 3-10 valent organic group;

Y represents, each independently at each occurrence, a hydrogen atom, a hydroxyl group, a hydrolyzable group, or a hydrocarbon group; with the proviso that a compound of the formula (I) wherein k=1 and all Y are an alkyl group in all units in parentheses with the subscript β is excepted;

Q represents, each independently at each occurrence, $-Z-SiR^1_pR^2_{3-p}$;

Z represents, each independently at each occurrence, a divalent organic group: with the proviso that Z is not a group which forms a siloxane bond together with a Si atom present in the end of the formula (1), $R^1$ represents, each independently at each occurrence, a hydroxyl group or a hydrolyzable group;

$R^2$ represents, each independently at each occurrence, a $C_{1-22}$ alkyl group or Q';

Q' has the same definition as that of Q;

p is, each independently in each Q and Q', an integer of 0-3, and the total sum of p is one or more in the formula (1);

in Q, the number of Si atoms which are straightly linked via the Z group is up to five;

k is, each independently in each unit in parentheses with the subscript β, an integer of 1-3; and α and β are, each independently, an integer of 1-9, and the sum of α and β is a valence of X.

According to second aspect of the present invention, there is provided a surface-treating agent comprising the at least one perfluoro(poly)ether group containing silane compound of the formula (1) described above.

According to third aspect of the present invention, there is provided an article comprising a base material and a layer which is formed on a surface of the base material from the surface-treating agent containing the at least one perfluoro(poly)ether group containing silane compound of the formula (1) described above.

Effect of the Invention

According to the present invention, there is provided a novel perfluoropolyether group containing silane compound. Furthermore, there is provided a surface-treating agent obtained by using the perfluoropolyether group containing silane compound of the invention. By using them, the surface-treating layer having water-repellency, oil-repellency and antifouling property as well as excellent surface slip property and excellent friction durability can be formed.

EMBODIMENTS TO CARRY OUT THE INVENTION

Hereinafter, the surface-treating agent of the present invention will be described.

The term "a hydrocarbon group" as used herein represents a group containing a carbon atom and a hydrogen atom. Examples of the hydrocarbon group include, but are not particularly limited to, a $C_{1-20}$ hydrocarbon group which may be substituted by one or more substituents, for example, an aliphatic hydrocarbon group, an aromatic hydrocarbon group, and the like. The "aliphatic hydrocarbon group" may be straight, branched or cyclic, and may be saturated or unsaturated. The hydrocarbon group may contain one or more ring structures. It is noted that the hydrocarbon group may have one or more N, O, S, Si, amide, sulfonyl, siloxane, carbonyl, carbonyloxy, or the like at its end or in its molecular chain.

As used herein, examples of the substituent of the "hydrocarbon group" include, but are not particularly limited to, for example a halogen atom; and a $C_{1-6}$ alkyl group, a $C_{2-6}$ alkenyl group, a $C_{2-6}$ alkynyl group, a $C_{3-10}$ cycloalkyl group, a $C_{3-10}$ unsaturated cycloalkyl group, a 5-10 membered heterocyclyl group, a 5-10 membered unsaturated heterocyclyl group, a $C_{6-10}$ aryl group, a 5-10 membered heteroaryl group, and the like which may be substituted by one or more halogen atoms.

The present invention provides a perfluoro(poly)ether group (hereinafter, also referred to as "PFPE") containing silane compound of the formula (1) (hereinafter, also referred to as "a PFPE containing silane compound of the present invention".

$$(Rf\text{-PFPE})_\alpha\text{-X}-(SiQ_kY_{3-k})_\beta \quad (1)$$

In the above-mentioned formula (1), Rf represents a $C_{1-16}$ alkyl which may be substituted by one or more fluorine atoms.

The "$C_{1-16}$ alkyl group" in the $C_{1-16}$ alkyl which may be substituted by one or more fluorine atoms may be straight or branched, and preferably is a straight or branched $C_{1-6}$, in particular $C_{1-3}$ alkyl group, more preferably a straight $C_{1-3}$ alkyl group.

The above-mentioned Rf is preferably a $C_{1-16}$ alkyl substituted by one or more fluorine atoms, more preferably a $CF_2H$—$C_{1-15}$ perfluoroalkylene group, more preferably a $C_{1-16}$ perfluoroalkyl group.

The $C_{1-16}$ perfluoroalkyl group may be straight or branched, and preferably is a straight or branched $C_{1-6}$, in particular $C_{1-3}$ perfluoroalkyl group, more preferably a straight $C_{1-3}$ perfluoroalkyl group, specifically —$CF_3$, —$CF_2CF_3$ or —$CF_2CF_2CF_3$.

In the above-mentioned formula (1), PFPE represents —$(OC_4F_8)_a$—$(OC_3F_6)_b$—$(OC_2F_4)_c$—$(OCF_2)_d$—, and corresponds to a perfluoro(poly)ether group. Herein, a, b, c and d are each independently 0 or an integer of 1 or more and are not particularly limited as long as the sum of a, b, c and d is 1 or more. Preferably, a, b, c and d are each independently an integer of 0 or more and 200 or less, for example an integer of 1 or more and 200 or less, more preferably each independently an integer of 0 or more and 100 or less, for example, an integer of 1 or more and 100 or less. More preferably, the sum of a, b, c and d is 10 or more, preferably 20 or more and 200 or less, preferably 100 or less. The occurrence order of the respective repeating units in parentheses with the subscript a, b, c or d is not limited in the formula. Among these repeating units, the —$(OC_4F_8)$— group may be any of —$(OCF_2CF_2CF_2CF_2)$—, —$(OCF(CF_3)CF_2CF_2)$—, —$(OCF_2CF(CF_3)CF_2)$—, —$(OCF_2CF_2CF(CF_3))$—, —$(OC(CF_3)_2CF_2)$—, —$(OCF_2C(CF_3)_2)$—, —$(OCF(CF_3)CF(CF_3))$—, —$(OCF(C_2F_5)CF_2)$— and —$(OCF_2CF(C_2F_5))$—, preferably —$(OCF_2CF_2CF_2CF_2)$—. The —$(OC_3F_6)$— group may be any of —$(OCF_2CF_2CF_2)$—, —$(OCF(CF_3)CF_2)$— and —$(OCF_2CF(CF_3))$—, preferably —$(OCF_2CF_2CF_2)$—. The —$(OC_2F_4)$— group may be any of —$(OCF_2CF_2)$— and —$(OCF(CF_3))$—, preferably —$(OCF_2CF_2)$—.

In one embodiment, PFPE is —$(OC_3F_6)_b$— wherein b is an integer of 1 or more and 200 or less, preferably 10 or more and 100 or less, preferably —$(OCF_2CF_2CF_2)_b$— wherein b is as defined above.

In another embodiment, PFPE is —$(OC_4F_8)_a$—$(OC_3F_6)_b$—$(OC_2F_4)_c$—$(OCF_2)_d$— wherein a and b are each independently an integer of 0 or more, or 1 or more and 30 or less, preferably 0 or more and 10 or less, and c and d are each independently an integer of 1 or more and 200 or less, preferably 10 or more and 100 or less. The sum of a, b, c and d is 10 or more, preferably 20 or more and 200 or less, preferably 100 or less. The occurrence order of the respective repeating units in parentheses with the subscript a, b, c or d is not limited in the formula. Preferably, Rf is —$(OCF_2CF_2CF_2CF_2)_a$—$(OCF_2CF_2CF_2)_b$—$(OCF_2CF_2)_c$—$(OCF_2)_d$— wherein a, b, c and d are as defined above. For example, PFPE may be —$(OCF_2CF_2)$—$(OCF_2)_d$— wherein c and d are as defined above.

In another embodiment, PFPE is —$(OC_2F_4$—$R^{11})_{n''}$—. In the formula, $R^{11}$ is a group selected from $OC_2F_4$, $OC_3F_6$ and $OC_4F_8$, or a combination of 2 or 3 groups independently selected from these groups. Examples of the combination of 2 or 3 groups independently selected from $OC_2F_4$, $OC_3F_6$ and $OC_4F_8$ include, but not limited to, for example, —$OC_2F_4OC_3F_6$—, —$OC_2F_4OC_4F_8$—, —$OC_3F_6OC_2F_4$—, —$OC_3F_6OC_3F_6$—, —$OC_3F_6OC_4F_8$—, —$OC_4F_8OC_4F_8$—, —$OC_4F_8OC_3F_6$—, —$OC_4F_8OC_2F_4$—, —$OC_2F_4OC_2F_4OC_3F_6$—, —$OC_2F_4OC_2F_4OC_4F_8$—, —$OC_2F_4OC_3F_6OC_2F_4$—, —$OC_2F_4OC_3F_6OC_3F_6$—, —$OC_2F_4OC_4F_8OC_2F_4$—, —$OC_3F_6OC_2F_4OC_2F_4$—, —$OC_3F_6OC_2F_4OC_3F_6$—, —$OC_3F_6OC_3F_6OC_2F_4$— and —$OC_4F_8OC_2F_4OC_2F_4$—, and the like. The n" is an integer of 2-100, preferably an integer of 2-50. In the above-mentioned formula, $OC_2F_4$, $OC_3F_6$ and $OC_4F_8$ may be straight or branched, preferably straight. In this embodiment, PFPE is preferably —$(OC_2F_4$—$OC_3F_6)_{n''}$— or —$(OC_2F_4$—$OC_4F_8)_{n''}$—.

In the above-mentioned formula (1), X represents a 3-10 valent organic group. The X group is recognized to be a linker which connects between a perfluoropolyether moiety (an Rf-PFPE moiety) providing mainly water-repellency, surface slip property and the like and a silane moiety (a —$SiQ_kY_{3-k}$ moiety) providing an ability to bind to a base material by hydrolyzing in the compound of the formula (1). Therefore, the X group may be any 3-10 valent organic group as long as the compound of the formula (1) can stably exist. Depending on the number of the valence of the X group, α and β in the formula are each independently an integer of 1-9, and the sum of α and β is equal to the number of the valence of the X group. For example, when X is a 4-valent organic group, α and β are each independently an integer of 1-3, and the sum of α and β is 4.

The "3-10 valent organic group" as used herein represents a 3-10 valent group containing a carbon atom. Examples of the 3-10 valent organic group include, but are not particularly limited to, a 3-10 valent group obtained by removing 2-9 hydrogen atoms from a hydrocarbon group. For example, examples of the 3-10 valent organic group include, but are not particularly limited to, a 3-7 valent group obtained by removing 2-6 hydrogen atoms from a hydrocarbon group or a 4-5 valent group obtained by removing 3-4 hydrogen atoms from a hydrocarbon group.

In a preferable embodiment, X is a 3-8 valent organic group, more preferably X is a 3-7 valent organic group, particularly preferably X is a 4 or 5 valent organic group.

The above mentioned X may be a group having a siloxane group. Examples of X include, but are not particularly limited to, for example a group of the following formula:

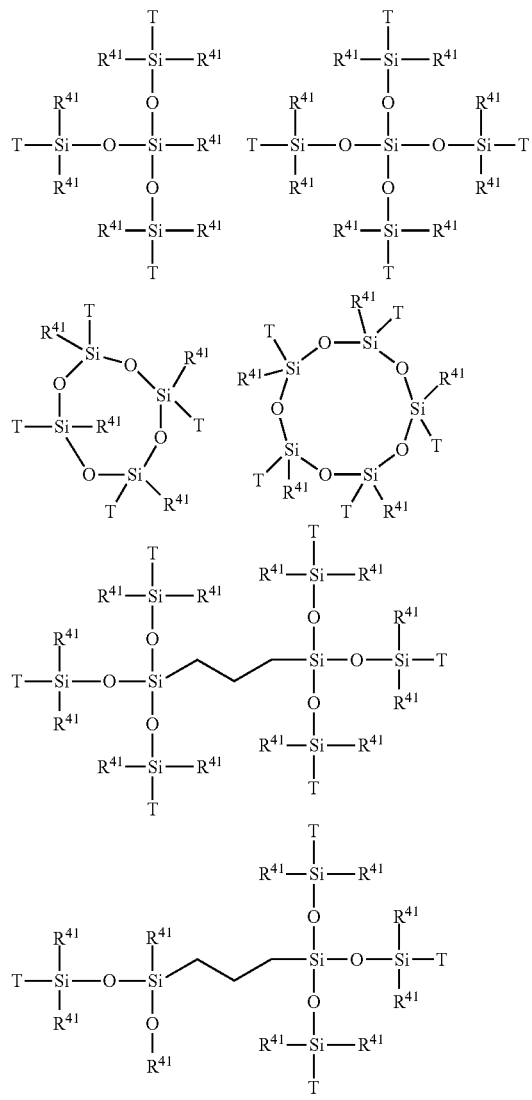

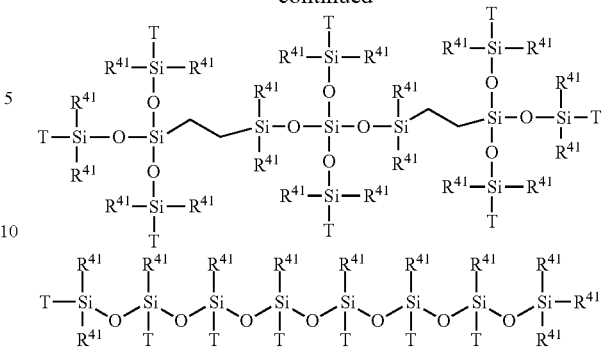

-continued wherein, in each X group, at least one of T is a following group attached to PFPE in the formula (1):
—$CH_2O(CH_2)_2$—,
—$CH_2O(CH_2)_3$—,
—$CF_2O(CH_2)_3$—,
—$(CH_2)_2$—,
—$(CH_2)_3$—,
—$(CH_2)_4$—,
—CONH—$(CH_2)_3$—,
—CON($CH_3$)—$(CH_2)_3$—,
—CON(Ph)-$(CH_2)_3$— wherein Ph represents a phenyl group, or

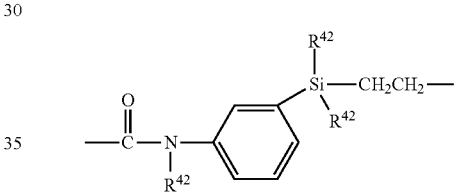

at least one of the other T is —$(CH_2)_n$— (wherein n is an integer of 2-6) attached to the Si atom in the formula (1), and the others are each independently a methyl group or a phenyl group if any, $R^{41}$ represents, each independently, a hydrogen atom, a phenyl group, a $C_{1-6}$ alkoxy group or a $C_{1-6}$ alkyl group, and $R^{42}$ represents, each independently, a hydrogen atom, a $C_{1-6}$ alkoxy group or a $C_{1-6}$ alkyl group. By using a linker having a siloxane group, the surface slip property can be improved.

In the above-mentioned formula (1), Y represents a hydrogen atom, a hydroxyl group, a hydrolyzable group or a hydrocarbon group. The hydroxyl group may be, but is not particularly limited to, a group generated by hydrolysis of a hydrolyzable group.

In the above mentioned formula (1), it is excluded that k=1 and all Y are an alkyl group in all units in parentheses with the subscript β. In other words, at least one Y in the formula (1) may be a hydroxyl group or a hydrolyzable group.

The term "a hydrolyzable group" as used herein represents a group which can leave from the main backbone of a compound by a hydrolysis reaction. Examples of the hydrolyzable group include, but are not particularly limited to, —$OR^7$, —$OCOR^7$, —O—N=C($R^7$)$_2$, —N($R^7$)$_2$, —$NHR^7$, and a halogen atom wherein $R^7$ represents, each independently at each occurrence, a $C_{1-12}$ alkyl group, preferably a substituted or unsubstituted $C_{1-3}$ alkyl group, more preferably a methyl group.

Preferably, Y is, each independently at each occurrence, selected from the group consisting of a hydroxyl group, a hydrolyzable group and a hydrocarbon group.

More preferably, Y is, each independently at each occurrence, selected from the group consisting of a hydroxyl group and a hydrolyzable group.

The hydrolyzable group in Y is, each independently at each occurrence, selected from a group of —OR$^7$ wherein R$^4$ is a C$_{1-12}$ alkyl group.

The hydrocarbon group in Y is, each independently at each occurrence, selected from the group consisting of a C$_{1-12}$ alkyl group, a C$_{2-12}$ alkenyl group, a C$_{2-12}$ alkynyl group and a phenyl group.

In the above-mentioned formula (1), Q represents —Z—SiR$^1_p$R$^2_{3-p}$.

Z represents, each independently at each occurrence, a divalent organic group.

Preferably, Z is not a group which forms a siloxane bond together with a Si atom present in the end of the molecular backbone of the formula (1).

Z is preferably a C$_{1-6}$ alkylene group, —(CH$_2$)$_{s'}$—O—(CH$_2$)$_{t'}$— wherein s' is an integer of 1-6 and t' is an integer of 1-6 or -phenylene-(CH$_2$)$_{u'}$— wherein u' is an integer of 0-6, more preferably a C$_{1-3}$ alkylene group. These groups may be substituted by one or more substituents selected from, for example, a fluorine atom, a C$_{1-6}$ alkyl group, a C$_{2-6}$ alkenyl group, and a C$_{2-6}$ alkynyl group.

R$^1$ represents, each independently at each occurrence, a hydroxyl group or a hydrolyzable group. R$^1$ is preferably —OR$^6$ wherein R$^6$ represents a C$_{1-12}$ alkyl group, preferably a substituted or unsubstituted C$_{1-3}$ alkyl group, more preferably a methyl group.

R$^2$ represents, each independently at each occurrence, a C$_{1-22}$ alkyl group or Q'.

The above-mentioned Q' has the same definition as that of Q.

p is, each independently in each Q and Q', an integer of 0-3, and the total sum of p is 1 or more. In each Q or Q', when p is 0, Si in such Q or Q' does not have a hydroxyl group and a hydrolyzable group. Therefore, the total sum of p must be at least one.

In Q' (or Q when Q' is not present) present in the end of -Q-Q'$_{0-5}$ chain binding to a Si atom present in the end of the main backbone having a perfluoro(poly)ether group, p is preferably 2, more preferably 3. The larger p is, the higher the friction durability can become.

When at least one R$^2$ in Q is Q', there are two or more Si atoms which are linearly connected via the Z group in Q. The number of such Si atoms which are linearly connected via the Z group is up to five. It is noted that "the number of such Si atoms which are linearly connected via the Z group in Q" is equal to the repeating number of —Z—Si— which are linearly connected in Q.

For example, one example in which Si atoms are connected via the Z group in Q is shown below.

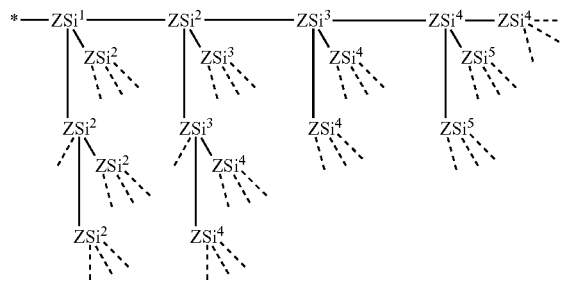

In the above formula, * represents a position binding to Si of the main backbone, and . . . represents that a predetermined group other than ZSi binds thereto, that is, when all three bonds of a Si atom are . . . , it means an end point of the repeat of Z. The number on the right shoulder of Si means the number of occurrences of Si which is linearly connected via the Z group from *. In other words, in the chain in which the repeat of ZSi is completed at Si$^2$, "the number of such Si atoms which are linearly connected via the Z group in Q" is 2, similarly, in the chain in which the repeat of ZSi is completed at Si$^3$, Si$^4$ and Si$^5$, respectively, "the number of such Si atoms which are linearly connected via the Z group in Q" is 3, 4 and 5. It is noted that as seen from the above formula, there are some ZSi chains, but they need not have the same length and may be have each any length.

In a preferred embodiment of the present invention, as shown below, "the number of such Si atoms which are linearly connected via the Z group in Q" is 1 (left formula) or 2 (right formula) in all chains.

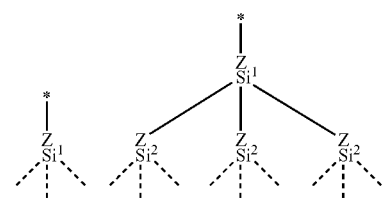

In one embodiment, the number of such Si atoms which are linearly connected via the Z group in Q is 1 (that is, there is only one Si in Q) or 2, preferably 1.

In the above-mentioned formula (1), k is an integer selected from 1 to 3, preferably 2 or more, more preferably 3. By setting k to 2, the binding to the base material becomes stronger than when k is 1, and by setting k to 3, the binding to the base material becomes much stronger, and it is possible to obtain high friction durability.

In one embodiment, the PFPE containing silane compound of the present invention is a compound of the formula (1) wherein R$^2$ in Q is a C$_{1-22}$ alkyl group.

In one embodiment, the PFPE containing silane compound of the present invention is a compound of the formula (1) wherein at least one of R$^2$ in Q is Q'.

In the above-mentioned PFPE containing silane compound of the formula (1), an average molecular weight of the PFPE moiety is, but not particularly limited to, 500-30,000, preferably 1,500-30,000, more preferably 2,000-10,000.

The above-mentioned PFPE containing silane compound of the present invention of the formula (1) has, for example, an average molecular weight of 1,000-40,000. It is preferable to have the average molecular weight of 2,000-32,000, more preferably 2,000-20,000, further more preferably 2,500-12,000, in view of friction durability. It is noted that the "average molecular weight" in the present invention means a number average molecular weight, and the "average molecular weight" is defined as a value measured by using $^{19}$F-NMR.

The perfluoro(poly)ether group containing silane compound of the formula (1) can be prepared by a known method, for example, by the method described in Patent Literature 1.

The PFPE containing silane compound of the formula (1) can be prepared by reacting a precursor compound having a plurality of partial structure of the formula (1-1):

Rf-PFPE-X'—CH=CH$_2$   (1-1)

wherein Rf and PFPE are as defined above, and X' represents a divalent organic group,
with a compound

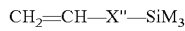
$$CH_2=CH-X''-SiM_3$$

wherein M represents each independently a halogen atom or a $C_{1-6}$ alkoxy group, and X'' represents a divalent organic group
to introduce a PFPE group and a $SiM_3$ group into the precursor compound,
reacting the $SiM_3$ moiety of the obtained compound with a Grignard reagent having a carbon-carbon double bond at the molecular terminal of the formula:

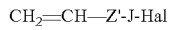
$$CH_2=CH-Z'-J-Hal$$

wherein Z' represents a bond or a divalent linker group, J represents Mg, Cu, Pd or Zn, and Hal represents a halogen atom
to introduce a group having a carbon-carbon double bond at its terminal into the Si atom derived from $CH_2=CH-X''-SiM_3$, and
further reacting the introduced carbon-carbon double bond with $HSiM'_3$ (wherein M' represents a hydrolyzable group) in hydrosilylation.

A reaction condition for preparing a perfluoro(poly)ether group containing silane compound of the formula (1) can be appropriately adjusted to a preferable range by those skilled in the art.

Next, the surface-treating agent of the present invention will be described.

The surface-treating agent of the present invention comprises at least one the perfluoro(poly)ether group containing silane compound of the formula (1).

The surface-treating agent of the present invention can provide a base material with water-repellency, oil-repellency, antifouling property, surface slip property and friction durability, and can be suitably used as an antifouling-coating agent, although the present invention is not particularly limited thereto.

In one embodiment, the surface-treating agent of the present invention comprises at least one compound of the formula (1) wherein k is 2 or more in at least one unit in parentheses with the subscript β in the formula (1).

In one embodiment, the surface-treating agent of the present invention comprises at least one compound of the formula (1) wherein k is 3 in at least one unit in parentheses with the subscript β in the formula (1).

In one embodiment, the surface-treating agent of the present invention comprises at least one compound of the formula (1) wherein the number of Si atoms which are straightly linked via the Z group in Q is 1 or 2.

In one embodiment, the surface-treating agent of the present invention comprises at least one compound of the formula (1) wherein Rf is a $C_{1-16}$ perfluoroalkyl group.

In another embodiment, the surface-treating agent of the present invention comprises two or more perfluoro(poly)ether group containing silane compounds of the formula (1). In this case, k in the units in parentheses with the subscript β may be an average.

The above-mentioned average of k means an average value of k in each PFPE containing silane compound of the formula (1) comprised in the surface-treating agent. Such average can be measured, for example, by using Si-NMR. Alternatively, the average can be measured by using H-NMR. The measurement can be easily conducted by those skilled in the art.

The average of all k in the compound may be 1 or more and 3 or less, for example, may be 2 or more and 3 or less, preferably 2.5 or more and 3.0 or less.

In further another embodiment, the surface-treating agent of the present invention comprises at least one compound of the formula (1) wherein $R^2$ is a $C_{1-22}$ alkyl group and k is 3.

The above-mentioned surface-treating agent may comprise other components in addition to the compound of the formula (1). Examples of the other components include, but are not particularly limited to, for example, a (non-reactive) fluoropolyether compound which may be also understood as a fluorine-containing oil, preferably a perfluoro(poly)ether compound (hereinafter, referred to as "the fluorine-containing oil"), a (non-reactive) silicone compound which may be also understood as a silicone oil (hereinafter referred to as "a silicone oil"), a catalyst, and the like.

Examples of the above-mentioned fluorine-containing oil include, but are not particularly limited to, for example, a compound of the following general formula (3) (a perfluoro(poly)ether compound).

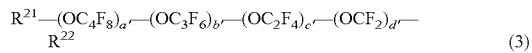
$$R^{21}-(OC_4F_8)_{a'}-(OC_3F_6)_{b'}-(OC_2F_4)_{c'}-(OCF_2)_{d'}-R^{22} \quad (3)$$

In the formula, $R^{21}$ represents a $C_{1-16}$ alkyl group which may be substituted by one or more fluorine atoms (preferably, a $C_{1-16}$ perfluoroalkyl group), $R^{22}$ represents a $C_{1-16}$ alkyl group which may be substituted by one or more fluorine atoms (preferably, a $C_{1-16}$ perfluoroalkyl group), a fluorine atom or a hydrogen atom, and more preferably, $R^{21}$ and $R^{22}$ is each independently a $C_{1-3}$ perfluoroalkyl group.

Subscripts a', b', c' and d' represent the repeating number of each of four repeating units of perfluoropolyether which constitute a main backbone of the polymer, and are each independently an integer of 0 or more and 300 or less, and the sum of a', b', c' and d' is at least 1, preferably 1-300, more preferably 20-300. The occurrence order of the respective repeating units in parentheses with the subscript a', b', c' or d' is not limited in the formulae. Among these repeating units, the $-(OC_4F_8)-$ group may be any of $-(OCF_2CF_2CF_2CF_2)-$, $-(OCF(CF_3)CF_2CF_2)-$, $-(OCF_2CF(CF_3)CF_2)-$, $-(OCF_2CF_2CF(CF_3))-$, $-(OC(CF_3)_2CF_2)-$, $-(OCF_2C(CF_3)_2)-$, $-(OCF(CF_3)CF(CF_3))-$, $-(OCF(C_2F_5)CF_2)-$ and $-(OCF_2CF(C_2F_5))-$, preferably $-(OCF_2CF_2CF_2CF_2)$. The $-(OC_3F_6)-$ group may be any of $-(OCF_2CF_2CF_2)-$, $-(OCF(CF_3)CF_2)-$ and $-(OCF_2CF(CF_3))-$, preferably $-(OCF_2CF_2CF_2)-$. The $-(OC_2F_4)-$ group may be any of $-(OCF_2CF_2)-$ and $-(OCF(CF_3))-$, preferably $-(OCF_2CF_2)-$.

Examples of the perfluoropolyether compound of the above general formula (3) include a compound of any of the following general formulae (3a) and (3b) (may be one compound or a mixture of two or more compounds).

$$R^{21}-(OCF_2CF_2CF_2)_{b''}-R^{22} \quad (3a)$$

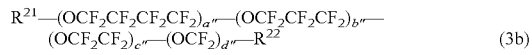
$$R^{21}-(OCF_2CF_2CF_2CF_2)_{a''}-(OCF_2CF_2CF_2)_{b''}-(OCF_2CF_2)_{c''}-(OCF_2)_{d''}-R^{22} \quad (3b)$$

In these formulae:
$R^{21}$ and $R^{22}$ are as defined above; in the formula (3a), b'' is an integer of 1 or more and 100 or less; and in the formula (3b), a'' and b'' are each independently an integer of 1 or more and 30 or less, and c'' and d'' are each independently an integer of 1 or more and 300 or less. The occurrence order of the respective repeating units in parentheses with the subscript a'', b'', c'' or d'' is not limited in the formulae.

The above-mentioned fluorine-containing oil may have an average molecular weight of 1,000-30,000. By having such average molecular weight, high surface slip property can be obtained.

The fluorine-containing oil may be contained in the surface-treating agent of the present invention, for example, at 0-500 parts by mass, preferably 0-400 parts by mass, more preferably 25-400 parts by mass with respect to 100 parts by mass of the PFPE containing silane compound of the present invention (as the total mass when two or more compounds are used; hereinafter the same shall apply).

The compound of the general formula (3a) and the compound of the general formula (3b) may be used alone or in combination. The compound of the general formula (3b) is preferable than the compound of the general formula (3a) since the compound of the general formula (3b) provides higher surface slip property than the compound of the general formula (3a). When they are used in combination, the ratio by mass of the compound of the general formula (3a) to the compound of the general formula (3b) is preferably 1:1 to 1:30, more preferably 1:1 to 1:10. By applying such ratio by mass, a perfluoropolyether group-containing silane-based coating which provides a good balance of surface slip property and friction durability can be obtained.

In one embodiment, the fluorine-containing oil comprises one or more compounds of the general formula (3b). In such embodiment, the mass ratio of the compound of the formula (1) to the compound of the formula (3b) in the surface-treating agent is preferably 4:1 to 1:4.

In one preferable embodiment, the surface-treating agent of the present invention comprises the compound of the formula (1) wherein PFPE is —(OCF$_2$CF$_2$CF$_2$)$_b$— (b is an integer of 1-200) and the compound of the formula (3b). By forming a surface-treating layer by using such surface-treating agent with a wet coating method or a vacuum deposition method, preferably vacuum deposition, excellent surface slip property and friction durability can be obtained.

In one preferable embodiment, the surface-treating agent of the present invention comprises the compound wherein PFPE represents —(OC$_4$F$_8$)$_a$—(OC$_3$F$_6$)$_b$—(OC$_2$F$_4$)$_c$—(OCF$_2$)$_d$— wherein a and b are each independently an integer of 0 or more and 30 or less, preferably 0 or more and 10 or less, and c and d are each independently an integer of 1 or more and 200 or less, and the sum of a, b, c and d is an integer of 10 or more and 200 or less. The occurrence order of the respective repeating units in parentheses with the subscript a, b, c or d is not limited in the formula and the compound of the formula (3b). By forming a surface-treating layer by using such surface-treating agent with a wet coating method or a vacuum deposition method, preferably vacuum deposition, more excellent surface slip property and friction durability can be obtained.

In these embodiments, an average molecular weight of the compound of the formula (3a) is preferably 2,000-8,000.

In these embodiments, an average molecular weight of the compound of the formula (3b) is preferably 8,000-30,000 when a surface-treating layer is formed by a dry coating method, for example, vacuum deposition, and is preferably 2,000-10,000, in particular 3,000-5,000 when a surface-treating layer is formed by using a wet coating method, for example, spray coating.

In a preferable embodiment, when a surface-treating layer is formed by using vacuum deposition, an average molecular weight of the fluorine-containing oil may be higher than an average molecular weight of the compound of the formula (1). By selecting such average molecular weights of the compound of the formula (1) and the fluorine-containing oil, more excellent surface slip property and friction durability can be obtained.

From the other point of view, the fluorine-containing oil may be a compound of the general formula A'-F wherein A' is a C$_{5-16}$ perfluoroalkyl group. The compound of A'-F is preferable because the compound has high affinity for the compound of the formula (1) wherein Rf is a C$_{1-16}$ perfluoroalkyl group.

The fluorine-containing oil contributes to increasing of surface slip property of the surface-treating layer.

Examples of the above-mentioned silicone oil include, for example, a liner or cyclic silicone oil having 2,000 or less siloxane bonds. The liner silicone oil may be so-called a straight silicone oil and a modified silicon oil. Examples of the straight silicone oil include dimethylsilicone oil, methylphenylsilicone oil, and methylhydrogensilicone oil. Examples of the modified silicone oil include that which is obtained by modifying a straight silicone oil with alkyl, aralkyl, polyether, higher fatty acid ester, fluoroalkyl, amino, epoxy, carboxyl, alcohol, or the like. Examples of the cyclic silicone oil include, for example, cyclic dimethylsiloxane oil.

The silicone oil may be contained in the surface-treating agent of the present invention, for example, at 0-300 parts by mass, preferably 50-200 parts by mass with respect to 100 parts by mass of the PFPE containing silane compound of the present invention (as the total mass when two or more compounds are used; hereinafter the same shall apply).

The silicone oil contributes to increasing of surface slip property of the surface-treating layer.

Examples of the above-mentioned catalyst include an acid (for example, acetic acid, trifluoroacetic acid, etc.), a base (for example, ammonia, triethylamine, diethylamine, etc.), a transition metal (for example, Ti, Ni, Sn, etc.), and the like.

The catalyst facilitates hydrolysis and dehydration-condensation of the PFPE containing silane compound of the present invention to facilitate a formation of the surface-treating layer.

Examples of the other components other than the above-mentioned components include, for example, tetraethoxysilane, methyltrimethoxysilane, 3-aminopropyltrimethoxysilane, 3-glycidoxypropyltrimethoxysilane, methyltriacetoxysilane, and the like.

The surface-treating agent of the present invention is impregnated into a porous material, for example, a porous ceramic material, a metal fiber for example that obtained by solidifying a steel wool to obtain a pellet. The pellet can be used, for example, in vacuum deposition.

Next, the article of the present invention will be described.

The article of the present invention comprises a base material and a layer (surface-treating layer) which is formed from the PFPE containing silane compound or the surface-treating agent of the present invention (hereinafter, referred to simply as "surface-treating agent" as a representative thereof) on the surface of the base material. This article can be produced, for example, as follows.

Firstly, the base material is provided. The base material usable in the present invention may be composed of any suitable material such as a glass, a resin (may be a natural or synthetic resin such as a common plastic material, and may be in form of a plate, a film, or others), a metal (may be a simple substance of a metal such as aluminum, copper, or iron, or a complex such as alloy or the like), a ceramic, a semiconductor (silicon, germanium, or the like), a fiber (a fabric, a non-woven fabric, or the like), a fur, a leather, a wood, a pottery, a stone, an architectural member or the like.

For example, when an article to be produced is an optical member, a material constituting the surface of the base material may be a material for an optical member, for example, a glass or a transparent plastic. For example, when an article to be produced is an optical member, any layer (or film) such as a hard coating layer or an antireflection layer may be formed on the surface (outermost layer) of the base material. As the antireflection layer, either a single antireflection layer or a multi antireflection layer may be used. Examples of an inorganic material usable in the antireflection layer include $SiO_2$, $SiO$, $ZrO_2$, $TiO_2$, $TiO$, $Ti_2O_3$, $Ti_2O_5$, $Al_2O_3$, $Ta_2O_5$, $CeO_2$, $MgO$, $Y_2O_3$, $SnO_2$, $MgF_2$, $WO_3$, and the like. These inorganic materials may be used alone or in combination with two or more (for example, as a mixture). When multi antireflection layer is formed, preferably, $SiO_2$ and/or SiO are used in the outermost layer. When an article to be produced is an optical glass part for a touch panel, it may have a transparent electrode, for example, a thin layer comprising indium tin oxide (ITO), indium zinc oxide, or the like on a part of the surface of the base material (glass). Furthermore, the base material may have an insulating layer, an adhesive layer, a protecting layer, a decorated frame layer (I-CON), an atomizing layer, a hard coating layer, a polarizing film, a phase difference film, a liquid crystal display module, and the like, depending on its specific specification.

The shape of the base material is not specifically limited. The region of the surface of the base material on which the surface-treating layer should be formed may be at least a part of the surface of the base material, and may be appropriately determined depending on use, the specific specification, and the like of the article to be produced.

The base material may be that of which at least the surface consists of a material originally having a hydroxyl group. Examples of such material include a glass, in addition, a metal on which a natural oxidized film or a thermal oxidized film is formed (in particular, a base metal), a ceramic, a semiconductor, and the like. Alternatively, as in a resin, when the hydroxyl groups are present but not sufficient, or when the hydroxyl group is originally absent, the hydroxyl group can be introduced on the surface of the base material, or the number of the hydroxyl group can be increased by subjecting the base material to any pretreatment. Examples of the pretreatment include a plasma treatment (for example, corona discharge) or an ion beam irradiation. The plasma treatment may be suitably used to introduce the hydroxyl group into or increase it on the surface of the base material, further, to clarify the surface of the base material (remove foreign materials, and the like). Alternatively, other examples of the pretreatment include a method wherein a monolayer of a surface adsorbent having a carbon-carbon unsaturated bond group is formed on the surface of the base material by using a LB method (Langmuir-Blodgett method) or a chemical adsorption method beforehand, and then, cleaving the unsaturated bond under an atmosphere of oxygen and nitrogen.

Alternatively, the base material may be that of which at least the surface consists of a material comprising other reactive group such as a silicon compound having one or more Si—H groups or alkoxysilane.

Next, the film of the above surface-treating agent of the present invention is formed on the surface of the base material, and the film is post-treated, as necessary, and thereby the surface-treating layer is formed from the surface-treating agent.

The formation of the film of the surface-treating agent of the present invention can be performed by applying the above surface-treating agent on the surface of the base material such that the surface-treating agent coats the surface. The method of coating is not specifically limited. For example, a wet coating method or a dry coating method can be used.

Examples of the wet coating method include dip coating, spin coating, flow coating, spray coating, roll coating, gravure coating, and a similar method.

Examples of the dry coating method include deposition (usually, vacuum deposition), sputtering, CVD and a similar method. The specific examples of the deposition method (usually, vacuum deposition) include resistance heating, electron beam, high-frequency heating using microwave, etc., ion beam, and a similar method. The specific examples of the CVD method include plasma-CVD, optical CVD, thermal CVD and a similar method. The deposition method is will be described below in more detail.

Additionally, coating can be performed by an atmospheric pressure plasma method.

When the wet coating method is used, the surface-treating agent of the present invention is diluted with a solvent, and then it is applied to the surface of the base material. In view of stability of the surface-treating agent of the present invention and volatile property of the solvent, the following solvents are preferably used: an aliphatic perfluorohydrocarbon having 5-12 carbon atoms (for example, perfluorohexane, perfluoromethylcyclohexane and perfluoro-1,3-dimethylcyclohexane); an aromatic polyfluorohydrocarbon (for example, bis(trifluoromethyl)benzene); an aliphatic polyfluorohydrocarbon (for example, $C_6F_{13}CH_2CH_3$ (for example, ASAHIKLIN (registered trademark) AC-6000 manufactured by Asahi Glass Co., Ltd.), 1,1,2,2,3,3,4-heptafluorocyclopentane (for example, ZEORORA (registered trademark) H manufactured by Nippon Zeon Co., Ltd.); a hydrofluoroether (HFE) (for example, an alkyl perfluoroalkyl ether such as perfluoropropyl methyl ether ($C_3F_7OCH_3$) (for example, Novec (trademark) 7000 manufactured by Sumitomo 3M Ltd.), perfluorobutyl methyl ether ($C_4F_9OCH_3$) (for example, Novec (trademark) 7100 manufactured by Sumitomo 3M Ltd.), perfluorobutyl ethyl ether ($C_4F_9OC_2H_5$) (for example, Novec (trademark) 7200 manufactured by Sumitomo 3M Ltd.), and perfluorohexyl methyl ether ($C_2F_5CF(OCH_3)C_3F_7$) (for example, Novec (trademark) 7300 manufactured by Sumitomo 3M Ltd.) (the perfluoroalkyl group and the alkyl group may be liner or branched)), or $CF_3CH_2OCF_2CHF_2$ (for example, ASAHIKLIN (registered trademark) AE-3000 manufactured by Asahi Glass Co., Ltd.) and the like. These solvents may be used alone or as a mixture of 2 or more compound. Among them, the hydrofluoroether is preferable, perfluorobutyl methyl ether ($C_4F_9OCH_3$) and/or perfluorobutyl ethyl ether ($C_4F_9OC_2H_5$) are particularly preferable.

When the dry coating method is used, the surface-treating agent of the present invention may be directly subjected to the dry coating method, or may be diluted with a solvent, and then subjected to the dry coating method.

The formation of the film is preferably performed so that the surface-treating agent of the present invention is present together with a catalyst for hydrolysis and dehydration-condensation in the coating. Simply, when the wet coating method is used, after the surface-treating agent of the present invention is diluted with a solvent, and just prior to applying it to the surface of the base material, the catalyst may be added to the diluted solution of the surface-treating agent of the present invention. When the dry coating method is used, the surface-treating agent of the present invention to which a catalyst has been added is used itself in deposition (usually, vacuum deposition), or pellets may be used in the deposition (usually, the vacuum deposition), wherein the pellets is obtained by impregnating a porous metal such as iron or copper with the surface-treating agent of the present invention to which the catalyst has been added.

As the catalyst, any suitable acid or base can be used. As the acid catalyst, for example, acetic acid, formic acid, trifluoroacetic acid, or the like can be used. As the base catalyst, for example, ammonia, an organic amine, or the like can be used.

Next, the film is post-treated as necessary. This post-treatment is, but not limited to, a treatment in which water supplying and dry heating are sequentially performed, in more particular, may be performed as follows.

After the film of the surface-treating agent of the present invention is formed on the surface of the base material as mentioned above, water is supplied to this film (hereinafter, referred to as precursor coating). The method of supplying water may be, for example, a method using dew condensation due to the temperature difference between the precursor coating (and the base material) and ambient atmosphere or spraying of water vapor (steam), but not specifically limited thereto.

It is considered that, when water is supplied to the precursor coating, water acts on a hydrolyzable group bonding to Si present in the perfluoro(poly)ether group containing silane compound in the surface-treating agent of the present invention, thereby enabling rapid hydrolysis of the compound.

The supplying of water may be performed under an atmosphere, for example, at a temperature of 0-250° C., preferably 60° C. or more, more preferably 100° C. or more and preferably 180° C. or less, more preferably 150° C. By supplying water at such temperature range, hydrolysis can proceed. The pressure at this time is not specifically limited but simply may be ambient pressure.

Then, the precursor coating is heated on the surface of the base material under a dry atmosphere over 60° C. The method of dry heating may be to place the precursor coating together with the base material in an atmosphere at a temperature over 60° C., preferably over 100° C., and for example, of 250° C. or less, preferably of 180° C. or less, and at unsaturated water vapor pressure, but not specifically limited thereto. The pressure at this time is not specifically limited but simply may be ambient pressure.

Under such atmosphere, between the PFPE containing silane compound of the present inventions, the groups (being hydroxyl groups when all $R^1$ are hydroxyl groups in the above mentioned compound of any of the formula (1); hereinafter the same shall apply) bonding to Si after hydrolysis are rapidly dehydration-condensed with each other. Furthermore, between the compound and the base material, the group bonding to Si in the compound after hydrolysis and a reactive group present on the surface of the base material are rapidly reacted, and when the reactive group present on the surface of the base material is a hydroxyl group, dehydration-condensation is caused. As the result, the bond between the PFPE containing silane compounds of the present invention is formed, and the bond between the compound and the base material is formed. It is noted that if present, the fluorine-containing oil and/or the silicone oil is held or acquired by an affinity to the perfluoropolyether group containing silane compound.

The above supplying of water and dry heating may be sequentially performed by using a superheated water vapor.

The superheated water vapor is a gas which is obtained by heating a saturated water vapor to a temperature over the boiling point, wherein the gas, under an ambient pressure, has become to have a unsaturated water vapor pressure by heating to a temperature over 100° C., generally of 250° C. or less, for example, of 180° C. or less, and over the boiling point. When the base material on which the precursor coating is formed is exposed to a superheated water vapor, firstly, due to the temperature difference between the superheated water vapor and the precursor coating of a relatively low temperature, dew condensation is generated on the surface of the precursor coating, thereby supplying water to the precursor coating. Presently, as the temperature difference between the superheated water vapor and the precursor coating decreases, water on the surface of the precursor coating is evaporated under the dry atmosphere of the superheated water vapor, and an amount of water on the surface of the precursor coating gradually decreases. During the amount of water on the surface of the precursor coating is decreasing, that is, during the precursor coating is under the dry atmosphere, the precursor coating on the surface of the base material contacts with the superheated water vapor, as a result, the precursor coating is heated to the temperature of the superheated water vapor (temperature over 100° C. under ambient pressure). Therefore, by using a superheated water vapor, supplying of water and dry heating are enabled to be sequentially carried out simply by exposing the base material on which the precursor coating is formed to a superheated water vapor.

As mentioned above, the post-treatment can be performed. It is noted that though the post-treatment may be performed in order to further increase friction durability, it is not essential in the producing of the article of the present invention. For example, after applying the surface-treating agent to the surface of the base material, it may be enough to only stand the base material.

As described above, the surface-treating layer derived from the film of the surface-treating agent of the present invention is formed on the surface of the base material to produce the article of the present invention. The surface-treating layer thus formed has high surface slip property and high friction durability. Furthermore, this surface-treating layer may have water-repellency, oil-repellency, antifouling property (for example, preventing from adhering a fouling such as fingerprints), waterproof property (preventing the ingress of water into an electrical member, and the like), surface slip property (or lubricity, for example, wiping property of a fouling such as fingerprints and excellent tactile feeling in a finger) depending on a composition of the surface-treating agent used, in addition to high friction durability, thus may be suitably used as a functional thin film.

Therefore, the present invention further provides an optical material having the hardened material on the outermost layer.

Examples of the optical material include preferably a variety of optical materials in addition to the optical material for displays, or the like exemplified in below: for example, displays such as a cathode ray tube (CRT; for example, TV, personal computer monitor), a liquid crystal display, a plasma display, an organic EL display, an inorganic thin-film EL dot matrix display, a rear projection display, a vacuum fluorescent display (VFD), a field emission display (FED; Field Emission Display), or a protective plate of such displays, or that in which these displays and protective plates have been subjected to antireflection treatment on their surface.

The article having the surface-treating layer obtained according to the present invention is not specifically limited to, but may be an optical member. Examples of the optical member include the followings: lens of glasses, or the like; a front surface protective plate, an antireflection plate, a polarizing plate, or an anti-glare plate on a display such as PDP and LCD; a touch panel sheet of an instrument such as a mobile phone or a personal digital assistance; a disk surface of an optical disk such as a Blu-ray disk, a DVD disk, a CD-R or MO; an optical fiber, and the like.

The article having the surface-treating layer obtained according to the present invention may be also a medical equipment or a medical material.

The thickness of the surface-treating layer is not specifically limited. For the optical member, the thickness of the surface-treating layer is within the range of 1-50 nm, 1-30 nm, 1-30 nm, preferably 1-15 nm, in view of optical performance, surface slip property, friction durability and antifouling property.

Hereinbefore, the article produced by using the surface-treating agent of the present invention is described in detail. It is noted that an application, a method for using or a method for producing the article are not limited to the above exemplification.

EXAMPLES

The surface-treating agent of the present invention will be described in detail through Examples, although the present invention is not limited to Examples. It is noted that in Examples, the occurrence order of the four repeating units $(CF_2O)$, $(CF_2CF_2O)$, $(CF_2CF_2CF_2O)$ and $(CF_2CF_2CF_2CF_2O)$ constituting the perfluoroether is not limited.

Synthesis Example 1

To a four necked flask of 100 mL provided with a reflux condenser, a thermometer and a stirrer, a perfluoroether modified alcohol compound (30 g) represented by an average composition:

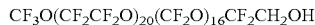

(with the proviso that a small amount of compound having some repeating units of $(CF_2CF_2CF_2CF_2O)$ and/or $(CF_2CF_2CF_2O)$ is contained in the mixture), 1,3-bis(trifluoromethyl)benzene (20 g) and NaOH (0.8 g) were added and stirred at 65° C. for 4 hours. Then, after allyl bromide (2.4 g) was added, the mixture was stirred at 65° C. for 6 hours. Then, the mixture was cooled to a room temperature, and perfluorohexane (20 g) was added. Washing with hydrochloric acid was performed. Then, a volatile content was evaporated to obtain the following perfluoropolyether group containing allyloxy compound (A) (24 g) having an allyl group at its terminal.

Perfluoropolyether group containing allyloxy compound (A):

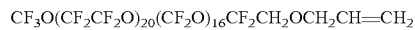

Synthesis Example 2

To a four necked flask of 50 mL provided with a reflux condenser, a thermometer and a stirrer, the perfluoropolyether group containing allyloxy compound (A) (10 g) prepared in Synthesis Example 1, 1,3-bis(trifluoromethyl)benzene (10 g), triacetoxymethylsilane (0.03 g) and 2,4,6,8-tetramethylcyclotetrasiloxane (0.73 g) were added and stirred under a nitrogen streaming. Then, after a xylene solution containing Pt complex of 1,3-divinyl-1,1,3,3-tetramethyldisiloxane at 2% (0.075 ml) was added, the mixture was stirred at 25° C. for 3 hours. Then, allyl trimethoxysilane (1.63 g) was added, and the mixture was stirred for 5 hours. Then, a volatile content was evaporated to obtain the following perfluoropolyether group containing cyclic silane compound (B) (10.4 g) having a trimethoxysilyl group at its terminal.

Perfluoropolyether group containing silane compound (B):

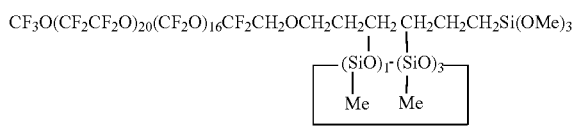

Synthesis Example 3

To a four necked flask of 50 mL provided with a reflux condenser, a thermometer and a stirrer, the perfluoropolyether group containing cyclic silane compound (B) having trimethoxysilyl group (7 g) prepared in Synthesis Example 2 and 1,3-bis(trifluoromethyl)benzene (7 g) were added and stirred under a nitrogen streaming. Then, 13.6 ml of tetrahydrofuran solution containing allyl magnesium bromide (2.0 mol/L) was added, and the mixture was stirred for 10 hours. Then, the mixture was cooled, 3 ml of methanol was added, and insoluble materials were filtered. Then, after a volatile content was evaporated, a nonvolatile fraction was diluted with perfluorohexane, and washing with methanol was performed. Then, a volatile content was evaporated to obtain the following perfluoropolyether group containing allyl compound (C) (7.9 g) having an allyl group at its terminal.

Perfluoropolyether group containing allyl compound (C):

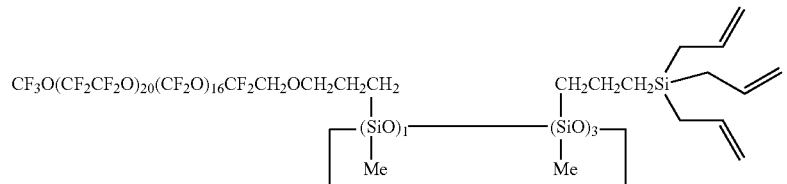

Synthesis Example 4

To a four necked flask of 50 mL provided with a reflux condenser, a thermometer and a stirrer, the perfluoropolyether group containing allyl compound (C) (7 g) having an allyl group at its terminal prepared in Synthesis Example 3, 1,3-bis(trifluoromethyl)benzene (7 g), triacetoxymethylsilane (0.02 g), and trichlorosilane (2.63 g) were added and stirred under a nitrogen streaming at 5° C. for 30 minutes. Then, after a xylene solution (0.07 ml) containing Pt complex of 1,3-divinyl-1,1,3,3-tetramethyldisiloxane at 2% was added, the mixture was stirred for 5 hours. Then, after a volatile content was evaporated, a mixed solution of methanol (0.29 g) and trimethyl orthoformate (6.72 g) was added and stirred for 3 hours. Then, the mixture was cooled to a room temperature and insoluble materials were filtered. A volatile content was evaporated to obtain the following perfluoropolyether group containing silane compound (D) (7.74 g) having a trimethoxysilyl group at its terminal.

Perfluoropolyether group containing silane compound (D):

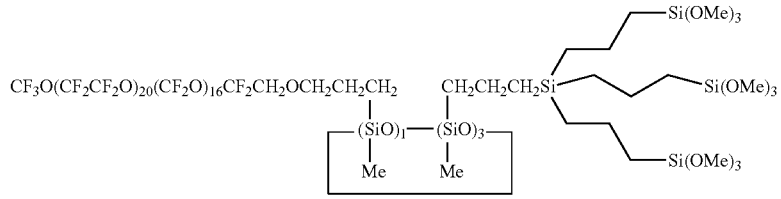

Synthesis Example 5

To a four necked flask of 50 mL provided with a reflux condenser, a thermometer and a stirrer, the perfluoropolyether group containing allyloxy compound (A) (10 g) prepared in Synthesis Example 1, 1,3-bis(trifluoromethyl)benzene (10 g), triacetoxysilane (0.03 g) and 2,4,6,8-tetramethylcyclotetrasiloxane (0.36 g) were added and stirred under a nitrogen streaming. Then, after a xylene solution (0.090 ml) containing Pt complex of 1,3-divinyl-1,1,3,3-tetramethyldisiloxane at 2% was added, the mixture was stirred at 25° C. for 3 hours. Then, allyl trimethoxysilane (0.99 g) was added, and the mixture was stirred for 5 hours. Then, a volatile content was evaporated to obtain the following perfluoropolyether group containing silane compound (E) (10.5 g) having a trimethoxysilyl group at its terminal.

Perfluoropolyether group containing silane compound (E):

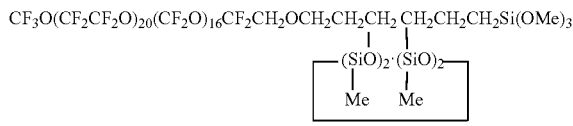

Synthesis Example 6

To a four necked flask of 50 mL provided with a reflux condenser, a thermometer and a stirrer, the perfluoropolyether group containing silane compound (E) (7 g) having a trimethoxysilyl group prepared in Synthesis Example 5 and 1,3-bis(trifluoromethyl)benzene (7 g) were added and stirred under a nitrogen streaming. Then, 13.6 ml of tetrahydrofuran solution containing allyl magnesium bromide (2.0 mol/L) was added, and the mixture was stirred for 10 hours at a room temperature. Then, the mixture was cooled, 3 ml of methanol was added, and insoluble materials were filtered. Then, after a volatile content was evaporated, a nonvolatile fraction was diluted with perfluorohexane, and washing with methanol was performed. Then, a volatile content was evaporated under a reduced pressure to obtain the following perfluoropolyether group containing allyl compound (F) (7.3 g) having an allyl group at its terminal.

Perfluoropolyether group containing allyl compound (F):

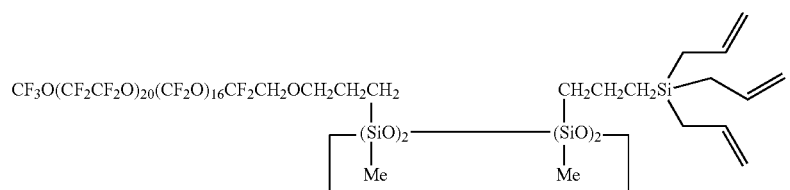

Synthesis Example 7

To a four necked flask of 50 mL provided with a reflux condenser, a thermometer and a stirrer, the perfluoropolyether group containing allyl compound (F) (7 g) having an allyl group at its terminal prepared in Synthesis Example 6, 1,3-bis(trifluoromethyl)benzene (7 g), triacetoxymethylsilane (0.02 g), and trichlorosilane (2.60 g) were added and stirred under a nitrogen streaming. Then, after a xylene solution (0.07 ml) containing Pt complex of 1,3-divinyl-1,1,3,3-tetramethyldisiloxane at 2% was added, the mixture was stirred for 5 hours. Then, after a volatile content was evaporated, a mixed solution of methanol (0.25 g) and trimethyl orthoformate (6.69 g) was added and stirred for 3 hours. Then, the mixture was cooled to a room temperature and insoluble materials were filtered. A volatile content was evaporated under a reduced pressure to obtain the following perfluoropolyether group containing silane compound (G) (7.12 g) having a trimethoxysilyl group at its terminal.

Perfluoropolyether Group Containing Silane Compound (G):

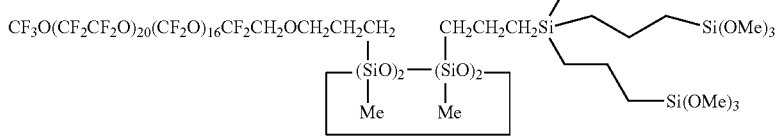

Example 1

Compound (D) was obtained in Synthesis Example 4 was dissolved in hydrofluoroether (Novec HFE7200 manufactured by Sumitomo 3M Ltd.)) such that the concentration was 20 wt % to prepare Surface-treating agent 1.

Surface-treating agent 1 prepared in the above was vacuum deposited on a chemical strengthening glass (Gorilla glass manufactured by Corning Incorporated; thickness: 0.7 mm). Processing condition of the vacuum deposition was a pressure of $3.0 \times 10^{-3}$ Pa. A silicon dioxide film having a thickness of 7 nm was formed on the surface of this chemical strengthening glass. Subsequently, the surface-treating agent of 2 mg (that is, it contained of 0.4 mg of Compound (D)) was vacuum-deposited per one plate of the chemical strengthening glass (55 mm×100 mm). Then, the chemical strengthening glass having the deposited layer was stood at 20° C. under an ambient of humidity of 65% for 24 hours.

Example 2

The surface-treating agent was prepared and the surface-treating layer was formed similarly to Example 1 except that Compound (G) obtained in Synthesis Example 7 was used in place of Compound (D).

Comparative Example 1

The surface-treating agent was prepared and the surface-treating layer was formed similarly to Example 1 except that Compound (B) obtained in Synthesis Example 2 was used in place of Compound (D).

Experiment 1

Evaluation of Surface Slip Property (Measurement of Coefficient of Dynamic Friction (COF))

Coefficient of dynamic friction of the surface-treating layers formed on the surface of the base material in the above Examples 1 and 2 and Comparative Example 1 was measured. Specifically, the coefficient of dynamic friction (-) was measured by using a surface texture measurement instrument (FPT-1 manufactured by Labthink Co., Ltd.) using a paper as a friction probe according to ASTM D4917. Specifically, the base material on which the surface-treating layer was formed was horizontally arranged, and then, a friction paper (2 cm×2 cm) was contacted to an exposed surface of the surface-treating layer and a load of 200 gf was applied thereon. Then, the friction paper was parallely moved at a speed of 500 mm/second while applying the load and the coefficient of dynamic friction was measured. The results are shown in Table 1.

Experiment 2

Evaluation of Friction Durability

Friction durability of the surface-treating layers formed on the surface of the base material in the above Examples 1 and 2 and Comparative Example 1 was measured by using eraser-friction durability test. Specifically, a sample member on which the surface-treating layer was formed was horizontally arranged, and then, an eraser (manufactured by Kokuyo Co., Ltd., KESHI-70, horizontal dimensions: 1 cm×1.6 cm) was contacted to the surface of the surface-treating layer and a load of 500 gf was applied thereon. Then, the eraser was shuttled at a rate of 20 mm/second while applying the load. The static water contact angle (degree) was measured per 1,000 shuttling. The evaluation was stopped when the measured value of the contact angle became to be less than 100 degree. The number of shuttling when the contact angle was lastly over 100 degree is shown in Table 2.

TABLE 1

|  | Coefficient of dynamic friction (—) | Eraser durability (time) |
|---|---|---|
| Example 1 | 0.028 | 4000 |
| Example 2 | 0.026 | 5000 |
| Comparative Example 1 | 0.033 | 3000 |

As understood from Table 1, it was confirmed that the surface-treating agent containing the perfluoro(poly)ether group containing silane compound of the present invention (Examples 1 and 2) can provide excellent friction durability in addition to excellent surface slip property (low coefficient of dynamic friction). On the other hand, the surface-treating agent containing the conventional perfluoro(poly)ether group containing silane compound (Comparative Example 1) has less surface slip property and friction durability in comparison with the surface-treating agent of the present invention. A reason for this is presumed as follows: the surface-treating agent of the present invention has more trimethoxysilyl groups which attach to a surface of the base material than the conventional surface-treating agent, that is, the surface-treating agent of the present invention can achieve stronger bonding to the base material, as a result of which, friction durability is improved.

INDUSTRIAL APPLICABILITY

The present invention is suitably applied for forming a surface-treating layer on a surface of various base materials, in particular, an optical member in which transparency is required.

The present invention includes following embodiments:

Embodiment 1. A perfluoro(poly)ether group containing silane compound of the formula (1):

$$(Rf\text{-}PFPE)_\alpha\text{-}X\text{---}(SiQ_kY_{3-k})_\beta \quad (1)$$

wherein:

Rf represents, each independently at each occurrence, a $C_{1-16}$ alkyl which may be substituted by one or more fluorine atoms;

PFPE represents $—(OC_4F_8)_a—(OC_3F_6)_b—(OC_2F_4)_c—(OCF_2)_d—$ wherein a, b, c and d are each independently an integer of 0 or more and 200 or less, the sum of a, b, c and d is 1 or more and the occurrence order of the respective repeating units in parentheses with the subscript a, b, c or d is not limited in the formula;

X represents, each independently at each occurrence, a 3-10 valent organic group;

Y represents, each independently at each occurrence, a hydrogen atom, a hydroxyl group, a hydrolyzable group, or a hydrocarbon group; with the proviso that a compound of the formula (I) wherein k=1 and all Y are an alkyl group in all units in parentheses with the subscript β is excepted;

Q represents, each independently at each occurrence, $—Z—SiR^1_pR^2_{3-p}$;

Z represents, each independently at each occurrence, a divalent organic group: with the proviso that Z is not a group which forms a siloxane bond together with a Si atom present in the end of the formula (1), $R^1$ represents, each independently at each occurrence, a hydroxyl group or a hydrolyzable group;

$R^2$ represents, each independently at each occurrence, a $C_{1-22}$ alkyl group or Q';

Q' has the same definition as that of Q;

p is, each independently in each Q and Q', an integer of 0-3, and the total sum of p is one or more in the formula (1);

in Q, the number of Si atoms which are straightly linked via the Z group is up to five;

k is, each independently in each unit in parentheses with the subscript β, an integer of 1-3; and α and β are, each independently, an integer of 1-9, and the sum of α and β is a valence of X.

Embodiment 2. The perfluoro(poly)ether group containing silane compound according to Embodiment 1 wherein k is 2 or more in at least one unit in parentheses with the subscript β in the formula (1).

Embodiment 3. The perfluoro(poly)ether group containing silane compound according to Embodiment 1 or Embodiment 2 wherein k is 3 in at least one unit in parentheses with the subscript β in the formula (1).

Embodiment 4. The perfluoro(poly)ether group containing silane compound according to any one of Embodiments 1-3 wherein k is 3 in all units in parentheses with the subscript β in the formula (1).

Embodiment 5. The perfluoro(poly)ether group containing silane compound according to any one of Embodiments 1-4 wherein the number of Si atoms which are straightly linked via the Z group in Q is one or two.

Embodiment 6. The perfluoro(poly)ether group containing silane compound according to any one of Embodiments 1-5 wherein the number of Si atoms which are straightly linked via the Z group in Q is one.

Embodiment 7. The perfluoro(poly)ether group containing silane compound according to any one of Embodiments 1-6 wherein Rf is a $C_{1-16}$ perfluoroalkyl group in the formula (1).

Embodiment 8. The perfluoro(poly)ether group containing silane compound according to any one of Embodiments 1-7 wherein PFPE in the formula (1) is a group of the following formula (a) or (b):

$$—(OC_3F_6)_b— \quad (a)$$

in the formula (a), b is an integer of from 1 or more and 200 or less; or $$—(OC_4F_8)_a—(OC_3F_6)_b—(OC_2F_4)_c—(OCF_2)_d— \quad (b)$$

in the formula (b), a and b are each independently an integer of 0 or more and 30 or less, c and d are each independently an integer of 1 or more and 200 or less, the sum of a, b, c and d is 10 or more and 200 or less, and the occurrence order of the respective repeating units in parentheses with the subscript a, b, c or d is not limited in the formula.

Embodiment 9. The perfluoro(poly)ether group containing silane compound according to any one of Embodiments 1-8 wherein in PFPE in the formula (1):

$—(OC_4F_8)_a—$ is $—(OCF_2 CF_2 CF_2 CF_2)_a—$, $—(OC_3F_6)_b—$ is $—(OCF_2 CF_2 CF_2)_b—$, and $—(OC_2F_4)_c—$ is $—(OCF_2 CF_2)_c—$.

Embodiment 10. The perfluoro(poly)ether group containing silane compound according to any one of Embodiments 1-9 wherein X in the formula (1) is a 3-5 valent organic group.

Embodiment 11. The perfluoro(poly)ether group containing silane compound according to any one of Embodiments 1-10 wherein X in the formula (1) is a group selected from the group consisting of:

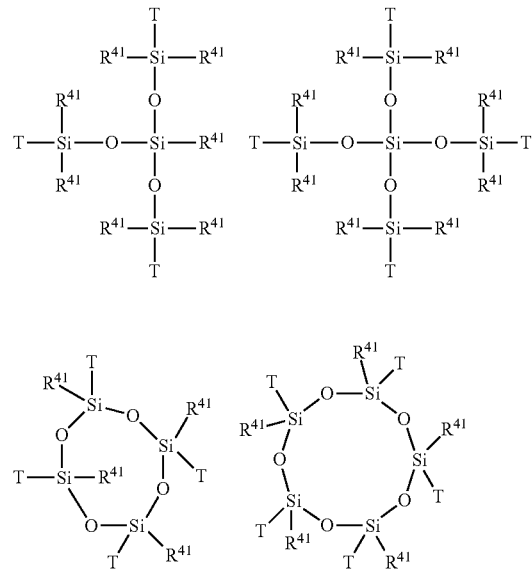

-continued

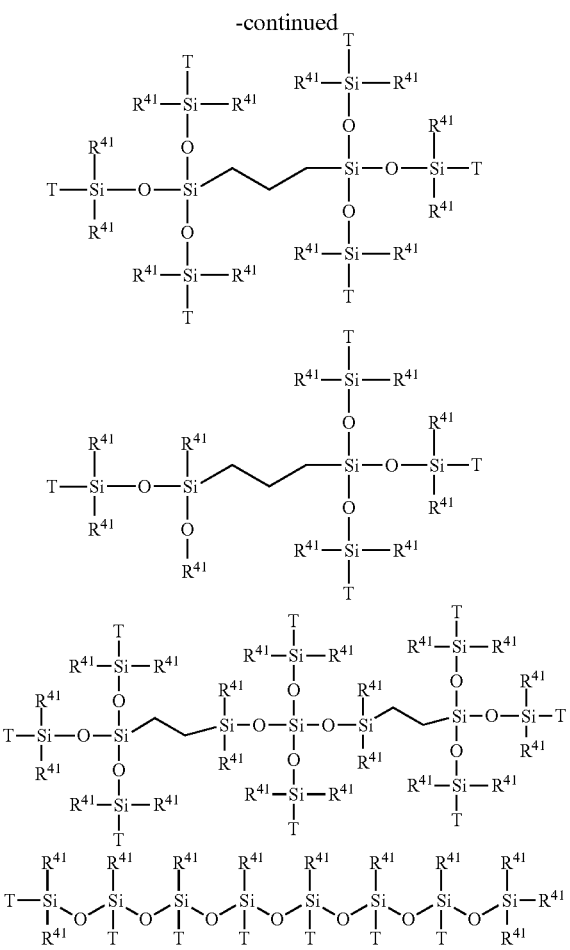

wherein in each X group, at least one of T is a following group attached to PFPE in the formula (1):
—CH$_2$O(CH$_2$)$_2$—,
—CH$_2$O(CH$_2$)$_3$—,
—CF$_2$O(CH$_2$)$_3$—,
—(CH$_2$)$_2$—,
—(CH$_2$)$_3$—,
—(CH$_2$)$_4$—,
—CONH—(CH$_2$)$_3$—,
—CON(CH$_3$)—(CH$_2$)$_3$—,
—CON(Ph)-(CH$_2$)$_3$— wherein Ph represents a phenyl group, and

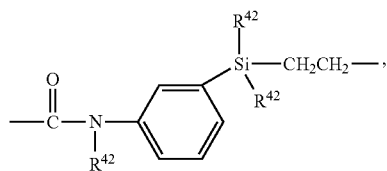

at least one of the other T is —(CH$_2$)$_2$— (wherein n is an integer of 2-6) attached to the Si atom in the formula (1), and the others are, each independently, a methyl group or a phenyl group, R$^{41}$ represents a hydrogen atom, a phenyl group or an alkyl group having 1 to 6 carbon atoms, and R$^{42}$ represents a hydrogen atom or a C$_{1-6}$ alkyl group.

Embodiment 12. The perfluoro(poly)ether group containing silane compound according to any one of Embodiments 1-11 wherein Y is, each independently at each occurrence, selected from the group consisting of a hydroxyl group and a hydrolyzable group.

Embodiment 13. The perfluoro(poly)ether group containing silane compound according to any one of Embodiments 1-12 wherein the hydrolyzable group in Y is, each independently at each occurrence, selected form a group of —OR$^7$ wherein R$^7$ is a C$_{1-12}$ alkyl group.

Embodiment 14. The perfluoro(poly)ether group containing silane compound according to any one of Embodiments 1-11 and 13 wherein the hydrocarbon group in Y is, each independently at each occurrence, selected from the group consisting of a C$_{1-12}$ alkyl group, a C$_{2-12}$ alkenyl group, a C$_{2-12}$ alkynyl group and a phenyl group.

Embodiment 15. The perfluoro(poly)ether group containing silane compound according to any one of Embodiments 1-14 wherein in Q in the formula (1), p is 3.

Embodiment 16. The perfluoro(poly)ether group containing silane compound according to any one of Embodiments 1-15 wherein
Rf is a C$_{1-16}$ perfluoroalkyl group,
PFPE is a group of the following formula (a) or (b):

$$—(OC_3F_6)_b— \quad (a)$$

wherein b is an integer of 1 or more and 200 or less; or $$—(OC_4F_8)_a—(OC_3F_6)_b—(OC_2F_4)_c—(OCF_2)_d— \quad (b)$$

wherein a and b are each independently an integer of 0 or more and 30 or less, c and d are each independently an integer of 1 or more and 200 or less, the sum of a, b, c and d is 10 or more and 200 or less, and the occurrence order of the respective repeating units in parentheses with the subscript a, b, c or d is not limited in the formula,
X is a 4-valent or 5-valent organic group,
k is 3, and
p is 3.

Embodiment 17. The perfluoro(poly)ether group containing silane compound according to any one of Embodiments 1-16 wherein a number average molecular weight of the PFPE moiety is 500-30,000.

Embodiment 18. The perfluoro(poly)ether group containing silane compound according to any one of Embodiments 1-17, having a number average molecular weight of 1,000-40,000.

Embodiment 19. A surface-treating agent comprising the at least one perfluoro(poly)ether group containing silane compound of the formula (1) according to any one of Embodiments 1-18.

Embodiment 20. The surface-treating agent according to Embodiment 19, further comprising one or more components selected form a fluorine-containing oil, a silicone oil and a catalyst.

Embodiment 21. The surface-treating agent according to Embodiment 20 wherein the fluorine-containing oil is one or more compounds of the formula (3):

$$R^{21}—(OC_4F_8)_{a'}—(OC_3F_6)_{b'}—(OC_2F_4)_{c'}—(OCF_2)_{d'}—R^{22} \quad (3)$$

wherein:
R$^{21}$ represents a C$_{1-16}$ alkyl group which may be substituted by one or more fluorine atoms;
R$^{22}$ represents a C$_{1-16}$ alkyl group which may be substituted by one or more fluorine atoms, a hydrogen atom or a fluorine atom; and
a', b', c' and d' represent the repeating number of each of four repeating units of perfluoro(poly)ether which constitute a main backbone of the polymer, and are each independently an integer of 0 or more and 300 or less, the sum of a', b', c' and d' is 1 or more, and the occurrence order of the respective repeating units in parentheses with the subscript a', b', c' and d' is not limited in the formula.

Embodiment 22. The surface-treating agent according to Embodiment 20 or Embodiment 21 wherein the fluorine-containing oil is one or more compounds of the formula (3a) or (3b):

$$R^{21}-(OCF_2CF_2CF_2)_{b'''}-R^{22} \quad (3a)$$

$$R^{21}-(OCF_2CF_2CF_2CF_2)_{a'''}-(OCF_2CF_2CF_2)_{b'''}-(OCF_2CF_2)_{c'''}-(OCF_2)_{d'''}-R^{22} \quad (3b)$$

wherein:

$R^{21}$ and $R^{22}$ are as defined in any preceding Embodiments;

in the formula (3a), b'' is an integer of 1 or more and 100 or less;

in the formula (3b), a'' and b'' are each independently an integer of 0 or more and 30 or less, and c'' and d'' are each independently an integer of 1 or more and 300 or less; the sum of a'', b'', c'' and d'' is an integer of one or more and 300 or less;

the occurrence order of the respective repeating units in parentheses with the subscript a'', b'', c'' or d'' is not limited in the formula.

Embodiment 23. The surface-treating agent according to Embodiment 22, at least comprising one or more compound of the formula (3b).

Embodiment 24. The surface-treating agent according to Embodiment 22 or Embodiment 23, comprising the compound of the formula (3a) and the compound of the formula (3b) at a mass ratio of 1:1-1:30.

Embodiment 25. The surface-treating agent according to any one of Embodiments 22-24, comprising the compound of the formula (3a) and the compound of the formula (3b) at a mass ratio of 1:1-1:10.

Embodiment 26. The surface-treating agent according to any one of Embodiments 22-25 wherein a mass ratio of at least one the perfluoro(poly)ether group containing silane compound of the formula (1) according to Embodiments 1-18 and the compound of the formula (3b) is 4:1-1:4.

Embodiment 27. The surface-treating agent according to any one of Embodiments 22-26 wherein the compound of the formula (3a) has a number average molecular weight of 2,000-8,000.

Embodiment 28. The surface-treating agent according to any one of Embodiments 22-27 wherein the compound of the formula (3b) has a number average molecular weight of 2,000-30,000.

Embodiment 29. The surface-treating agent according to any one of Embodiments 22-28 wherein the compound of the formula (3b) has a number average molecular weight of 8,000-30,000.

Embodiment 30. The surface-treating agent according to any one of Embodiments 19-29, further comprises a solvent.

Embodiment 31. The surface-treating agent according to any one of Embodiments 19-30 which is used as an anti-fouling-coating agent.

Embodiment 32. The surface-treating agent according to any one of Embodiments 19-31 for vacuum deposition.

Embodiment 33. A pellet comprising the surface-treating agent according to any one of Embodiments 19-32.

Embodiment 34. An article comprising a base material and a layer which is formed on a surface of the base material from the surface-treating agent according to any one of Embodiments 19-32.

Embodiment 35. The article according to Embodiment 34 which is an optical member.

Embodiment 36. The article according to Embodiment 34 or Embodiment 35 which is a display.

The invention claimed is:

1. A perfluoro(poly)ether group containing silane compound of the formula (1):

$$(Rf\text{-}PFPE)_\alpha-X-(SiQ_kY_{3-k})_\beta \quad (1)$$

wherein:

Rf represents, each independently at each occurrence, a $C_{1-16}$ alkyl which may be substituted by one or more fluorine atoms;

PFPE represents $-(OC_4F_8)_a-(OC_3F_6)_b-(OC_2F_4)_c-(OCF_2)_d-$ wherein a, b, c and d are each independently an integer of 0 or more and 200 or less, the sum of a, b, c and d is 1 or more and the occurrence order of the respective repeating units in parentheses with the subscript a, b, c or d is not limited in the formula;

X represents, each independently at each occurrence, a 3-10 valent organic group;

Y represents, each independently at each occurrence, a hydrogen atom, a hydroxyl group, a hydrolyzable group, or a hydrocarbon group; with the proviso that a compound of the formula (I) wherein k=1 and all Y are an alkyl group in all units in parentheses with the subscript β is excepted;

Q represents, each independently at each occurrence, $-Z-SiR^1_pR^2_{3-p}$;

Z represents, each independently at each occurrence, a divalent organic group: with the proviso that Z is not a group which forms a siloxane bond together with a Si atom present in the end of the formula (1), $R^1$ represents, each independently at each occurrence, a hydroxyl group or a hydrolyzable group;

$R^2$ represents, each independently at each occurrence, a $C_{1-22}$ alkyl group or Q';

Q' has the same definition as that of Q;

p is, each independently in each Q and Q', an integer of 0-3, and the total sum of p is one or more in the formula (1);

in Q, the number of Si atoms which are straightly linked via the Z group is up to five;

k is, each independently in each unit in parentheses with the subscript β, an integer of 1-3; and α and β are, each independently, an integer of 1-9, and the sum of α and β is a valence of X.

2. The perfluoro(poly)ether group containing silane compound according to claim 1 wherein k is 2 or more in at least one unit in parentheses with the subscript β in the formula (1).

3. The perfluoro(poly)ether group containing silane compound according to claim 1 wherein k is 3 in at least one unit in parentheses with the subscript β in the formula (1).

4. The perfluoro(poly)ether group containing silane compound according to claim 1 wherein k is 3 in all units in parentheses with the subscript β in the formula (1).

5. The perfluoro(poly)ether group containing silane compound according to claim 1 wherein the number of Si atoms which are straightly linked via the Z group in Q is one or two.

6. The perfluoro(poly)ether group containing silane compound according to claim 1 wherein the number of Si atoms which are straightly linked via the Z group in Q is one.

7. The perfluoro(poly)ether group containing silane compound according to claim 1 wherein Rf is a $C_{1-16}$ perfluoroalkyl group in the formula (1).

8. The perfluoro(poly)ether group containing silane compound according to claim 1 wherein PFPE in the formula (1) is a group of the following formula (a) or (b):

$$—(OC_3F_6)_b— \qquad (a)$$

in the formula (a), b is an integer of from 1 or more and 200 or less; or $$—(OC_4F_8)_a—(OC_3F_6)_b—(OC_2F_4)_c—(OCF_2)_d— \qquad (b)$$

in the formula (b), a and b are each independently an integer of 0 or more and 30 or less, c and d are each independently an integer of 1 or more and 200 or less, the sum of a, b, c and d is 10 or more and 200 or less, and the occurrence order of the respective repeating units in parentheses with the subscript a, b, c or d is not limited in the formula.

9. The perfluoro(poly)ether group containing silane compound according to claim 1 wherein in PFPE in the formula (1):
—$(OC_4F_8)_a$— is —$(OCF_2CF_2CF_2CF_2)_a$—,
—$(OC_3F_6)_b$— is —$(OCF_2CF_2CF_2)_b$—, and
—$(OC_2F_4)_c$— is —$(OCF_2CF_2)_c$—.

10. The perfluoro(poly)ether group containing silane compound according to claim 1 wherein X in the formula (1) is a 3-5 valent organic group.

11. The perfluoro(poly)ether group containing silane compound according to claim 1 wherein X in the formula (1) is a group selected from the group consisting of:

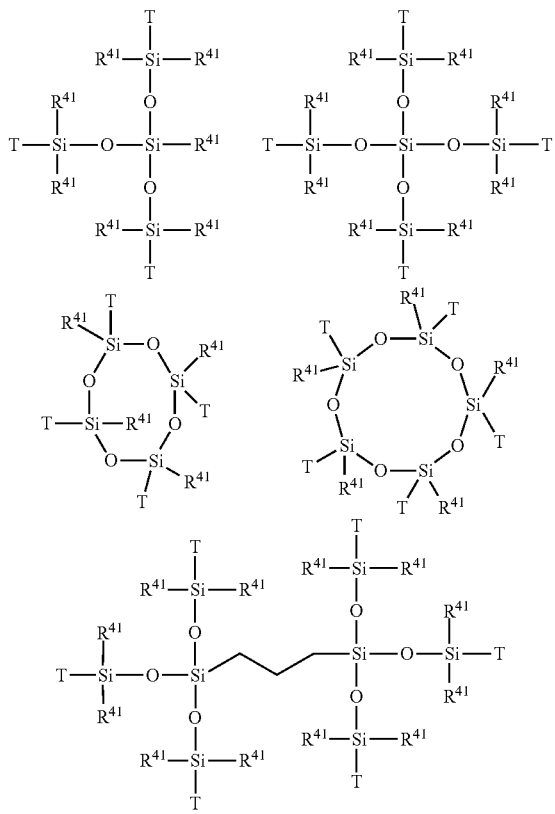
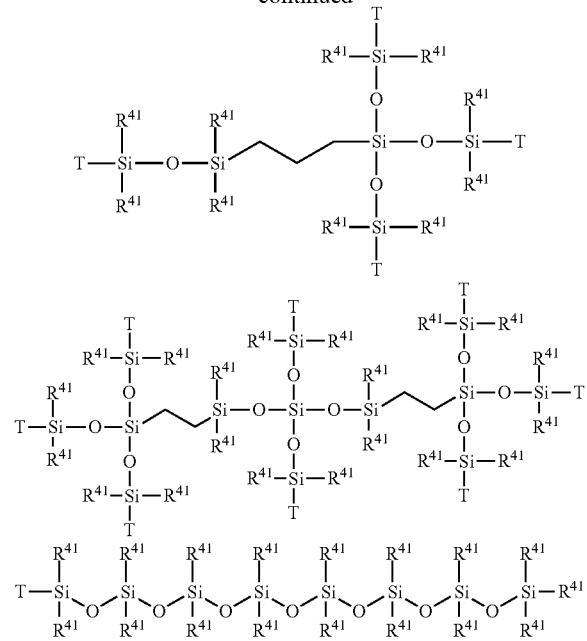

wherein in each X group, at least one of T is a following group attached to PFPE in the formula (1):
—$CH_2O(CH_2)_2$—,
—$CH_2O(CH_2)_3$—,
—$CF_2O(CH_2)_3$—,
—$(CH_2)_2$—,
—$(CH_2)_3$—,
—$(CH_2)_4$—,
—$CONH$—$(CH_2)_3$—,
—$CON(CH_3)$—$(CH_2)_3$—,
—$CON(Ph)$-$(CH_2)_3$ — wherein Ph represents a phenyl group, and

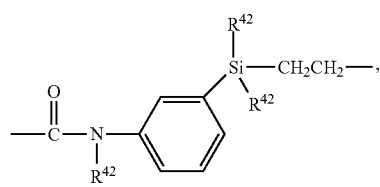

at least one of the other T is —$(CH_2)_n$— (wherein n is an integer of 2-6) attached to the Si atom in the formula (1), and
the others are, each independently, a methyl group or a phenyl group,
$R^{41}$ represents a hydrogen atom, a phenyl group or an alkyl group having 1 to 6 carbon atoms, and
$R^{42}$ represents a hydrogen atom or a $C_{1-6}$ alkyl group.

12. The perfluoro(poly)ether group containing silane compound according to claim 1 wherein Y is, each independently at each occurrence, selected from the group consisting of a hydroxyl group and a hydrolyzable group.

13. The perfluoro(poly)ether group containing silane compound according to claim 1 wherein the hydrolyzable group in Y is, each independently at each occurrence, selected form a group of —$OR^7$ wherein $R^7$ is a $C_{1-12}$ alkyl group.

14. The perfluoro(poly)ether group containing silane compound according to claim 1 wherein the hydrocarbon group in Y is, each independently at each occurrence, selected from the group consisting of a $C_{1-12}$ alkyl group, a $C_{2-12}$ alkenyl group, a $C_{2-12}$ alkynyl group and a phenyl group.

15. The perfluoro(poly)ether group containing silane compound according to claim 1 wherein in Q in the formula (1), p is 3.

16. The perfluoro(poly)ether group containing silane compound according to claim 1 wherein Rf is a $C_{1-16}$ perfluoroalkyl group, PFPE is a group of the following formula (a) or (b):

(a)

wherein b is an integer of 1 or more and 200 or less; or

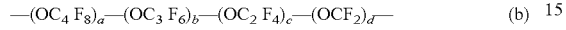
(b)

wherein a and b are each independently an integer of 0 or more and 30 or less, c and d are each independently an integer of 1 or more and 200 or less, the sum of a, b, c and d is 10 or more and 200 or less, and the occurrence order of the respective repeating units in parentheses with the subscript a, b, c or d is not limited in the formula, X is a 4-valent or 5-valent organic group, k is 3, and p is 3.

17. The perfluoro(poly)ether group containing silane compound according to claim 1 wherein a number average molecular weight of the PFPE moiety is 500-30,000.

18. The perfluoro(poly)ether group containing silane compound according to claim 1, having a number average molecular weight of 1,000-40,000.

19. A surface-treating agent comprising at least one perfluoro(poly)ether group containing silane compound of the formula (1) according to claim 1.

20. The surface-treating agent according to claim 19, further comprising one or more components selected form a fluorine-containing oil, a silicone oil and a catalyst.

21. The surface-treating agent according to claim 20 wherein the fluorine-containing oil is one or more compounds of the formula (3):

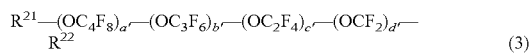
(3)

wherein:

R21 represents a $C_{1-16}$ alkyl group which may be substituted by one or more fluorine atoms;

$R^{22}$ represents a $C_{1-16}$ alkyl group which may be substituted by one or more fluorine atoms, a hydrogen atom or a fluorine atom; and a', b', c' and d' represent the repeating number of each of four repeating units of perfluoro(poly)ether which constitute a main backbone of the polymer, and are each independently an integer of 0 or more and 300 or less, the sum of a', b', c' and d' is 1 or more, and the occurrence order of the respective repeating units in parentheses with the subscript a', b', c' and d' is not limited in the formula.

22. The surface-treating agent according to claim 20 wherein the fluorine-containing oil is one or more compounds of the formula (3a) or (3b):

(3a)

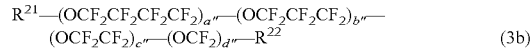
(3b)

wherein:

$R^{21}$ and $R^{22}$ are as defined in any preceding claims;

in the formula (3a), b" is an integer of 1 or more and 100 or less;

in the formula (3b), a" and b" are each independently an integer of 0 or more and 30 or less, and c" and d" are each independently an integer of 1 or more and 300 or less; the sum of a", b", c" and d" is an integer of one or more and 300 or less;

the occurrence order of the respective repeating units in parentheses with the subscript a", b", c" or d" is not limited in the formula.

23. The surface-treating agent according to claim 22, at least comprising one or more compounds of the formula (3b).

24. The surface-treating agent according to claim 22, comprising the compound of the formula (3a) and the compound of the formula (3b) at a mass ratio of 1:1-1:30.

25. The surface-treating agent according to claim 22, comprising the compound of the formula (3a) and the compound of the formula (3b) at a mass ratio of 1:1-1:10.

26. The surface-treating agent according to claim 22 comprising the compound of the formulae (3b), wherein a mass ratio of the at least one perfluoro(poly)ether group containing silane compound of the formula (1) according to claim 1 and the compound of the formula (3b) is 4:1-1:4.

27. The surface-treating agent according to claim 22 wherein the compound of the formula (3a) has a number average molecular weight of 2,000-8,000.

28. The surface-treating agent according to claim 22 wherein the compound of the formula (3b) has a number average molecular weight of 2,000-30,000.

29. The surface-treating agent according to claim 22 wherein the compound of the formula (3b) has a number average molecular weight of 8,000-30,000.

30. The surface-treating agent according to claim 19, further comprising a solvent.

31. A method of imparting antifouling property to a base material which comprises applying the surface-treating agent according to claim 19 on a surface of the base material.

32. A method of forming a surface-treating layer on a base material which comprises depositing the surface-treating agent according to claim 19 on a surface of the base material by vacuum deposition.

33. A pellet comprising the surface-treating agent according to claim 19.

34. An article comprising a base material and a layer which is formed on a surface of the base material from the surface-treating agent according to claim 19.

35. The article according to claim 34 which is an optical member.

36. The article according to claim 34 which is a display.

* * * * *